July 2, 1940.     G. L. LARISON     2,206,359
SPRING MOUNTING FOR VEHICLES
Filed Feb. 24, 1939     4 Sheets-Sheet 2

Inventor
Glenn L. Larison
By T. J. Geisler
and F. R. Geisler
Attorneys

July 2, 1940.　　　　　G. L. LARISON　　　　　2,206,359
SPRING MOUNTING FOR VEHICLES
Filed Feb. 24, 1939　　　　4 Sheets-Sheet 3

Inventor
Glenn L. Larison
By T. J. Geisler
and T. R. Geisler
Attorneys

July 2, 1940.  G. L. LARISON  2,206,359
SPRING MOUNTING FOR VEHICLES
Filed Feb. 24, 1939  4 Sheets-Sheet 4

Inventor
Glenn L. Larison
By T. J. Geisler
and F. A. Geisler
Attorneys

Patented July 2, 1940

2,206,359

UNITED STATES PATENT OFFICE 2,206,359

SPRING MOUNTING FOR VEHICLES

Glenn L. Larison, La Grande, Oreg., assignor to Larison Compensating Axle Corporation, a corporation of Oregon Application February 24, 1939, Serial No. 258,239

6 Claims. (Cl. 280—124)

This invention relates to wheel mounting for vehicles in which multiple wheels are necessary for properly carrying the load, and it relates, in particular, to wheel mountings arranged in pairs with connecting means between the members of each pair, whereby each wheel of the pair may be raised separately above the other wheel, but the two will always remain in the same parallel planes, and each of the wheels will at all times carry its share of the load.

More specifically, this invention refers to, and is a continuation in part of the invention described in my co-pending application, Serial No. 223,275, filed under date of August 5, 1938, and entitled Compensating wheel mounting for vehicles.

The object of this invention is to provide an improved vehicle mounting of the type indicated which will include adequate spring means directly supporting the weight of the vehicle for the purpose of further cushioning the shocks produced by road irregularities. The manner in which this and other objects are attained as a result of my invention will be apparent from the following description of certain embodiments of the construction illustrated in the accompanying drawings constituting part of this specification.

Figure 1:
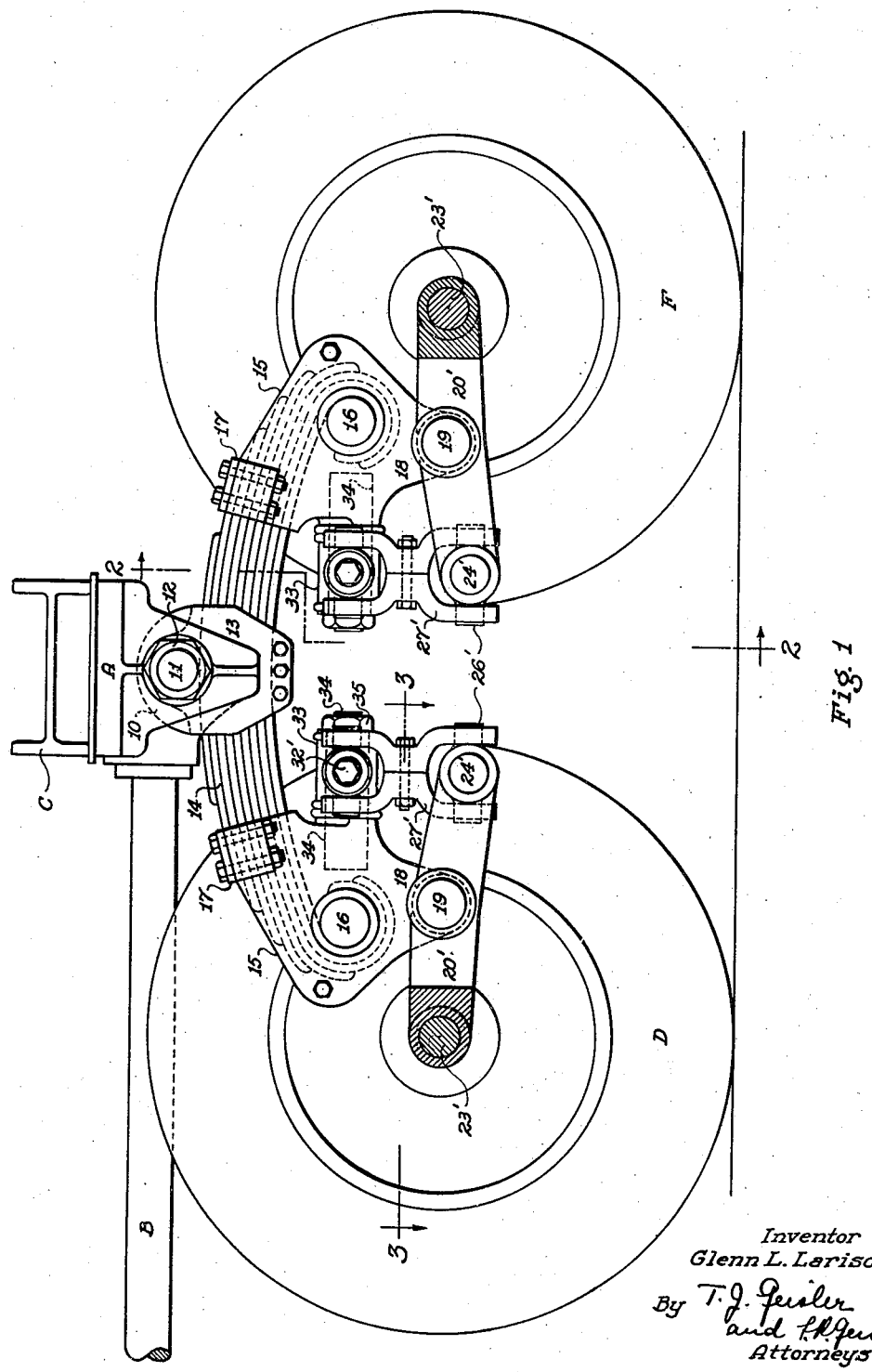
Fig. 1 is a side elevation, partly in vertical section, of a heavy duty trailer vehicle embodying one form of my invention, the wheel supports being shown for one of the two sets of four wheels with which the trailer is equipped.

The type of vehicle illustrated in the drawings is a heavy duty trailer consisting of the usual skeleton load-carrying structure, and a plurality of road wheels with means for supporting the load-carrying structure on the wheels. The skeleton chassis shown comprises a substantial transverse bolster A, an attached draw bar B and a load-bearing bunk C centrally pivoted on the bolster A. The wheels are arranged in two sets of four to support the transverse member at opposite ends but since these two sets of wheels and the means for connecting the wheels to the vehicle chassis are identical, the illustration and description of one set of wheels and their suspension mechanism is considered sufficient.

The four wheels of each set are symmetrically arranged in tandem pairs DE and FG aligned in the direction of travel of the vehicle and independently connected to the suspension mechanism in such manner that the wheels comprising each pair are in substantial axial alignment.

Figure 2:
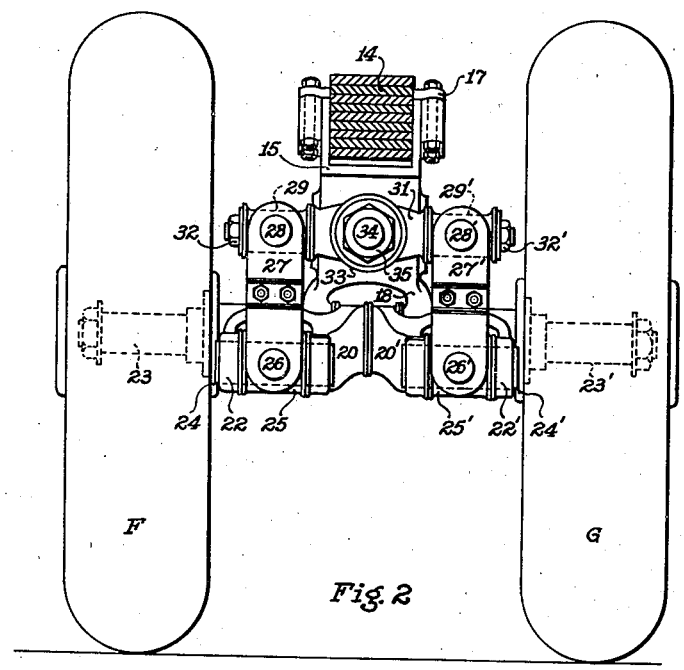
Fig. 2 is a vertical section taken on line 2—2 of Fig. 1.
Figure 3:
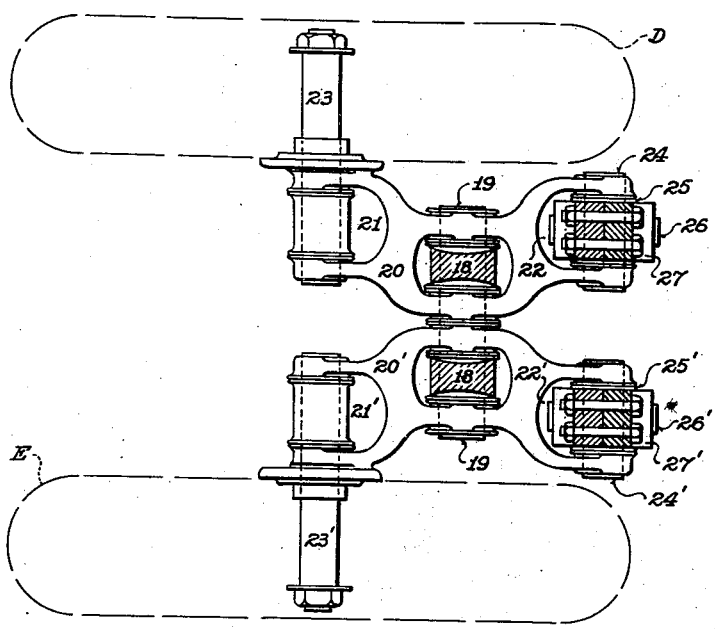
Fig. 3 is a fragmentary sectional plan taken on line 3—3 of Fig. 1.

Referring first to Figs. 1, 2 and 3, in the transverse bolster A is a centrally-aligned transverse shaft 11, which preferably extends throughout the entire bolster and is held against axial displacement by a nut 12 threaded on each projecting end, the said shaft passing thru a recess 10 of the bolster A. Mounted for free partial rotation on the shaft 11 is a cradle 13 in which is securely clamped a compound arched spring 14 consisting of multiple leaves of graduated lengths, the spring thus supporting the shaft 11 and being rockable with respect to the shaft and to the transverse bolster A. This compound flexible member 14 is made sufficiently strong to sustain, with minimum deflection, one-half of the normal load carried on the vehicle and divides this portion of the load equally among the pairs of wheels DE and FG through the medium of identical compensating wheel-suspension assemblies.

Each of these wheel assemblies is carried on a substantial hanger casting or cap 15, the upper part of which is made hollow to receive the end of the spring member 14, the extremities of the lowermost leaves of the spring member having previously been bent to form an eye for a shaft 16 which is keyed or otherwise secured in the cap 15. A retaining bar 17, on top of each cap, overlies the spring and is bolted through thickened portions of the cap substantially as shown in Figs. 1 and 2. The lower portion of the cap 15 is bifurcated to form a yoke 18 (see Figs. 1 and 2), in which is secured a rocker pin 19 (see Fig. 3), the axis of which is parallel to the shaft 16 and to the shaft 11.

A pair of arms 20 and 20', each constituting part of a wheel-carrying assembly, are fulcrumed on the rocker pin 19, and are preferably made in the form illustrated in Fig. 3, having their laterally extending ends bifurcated as at 21, 21' and 22, 22', respectively. The outwardly extended yokes 21 and 21' provide spaced supports for the wheel spindles 23 and 23' securely disposed therein, on which spindles are rotatably mounted the road wheels D and E, respectively (and the wheels F and G). The opposite yokes 22 and 22' are fitted with shafts 24 and 24' upon which are rotatably mounted the pivot bearings 25 and 25' formed with projections 26 and 26' (shown dotted in Fig. 1), which projections in turn are journaled in the lower legs of H-shaped coupling links 27 and 27'. The upper legs of these H-shaped links 27 and 27' are similarly mounted on the pin projections 28 and 28' of a second pair of pivot bearings 29 and 29', which are rotatably carried on the ends of the compensating link or rocker 31 and retained against axial displacement therefrom by nuts 32 and 32', as seen in Fig. 2.

The compensating link or rocker 31 has a substantial hub 33 and is mounted for pivotal motion on a trunnion 34 rigidly secured in the cap 15, and is retained in position on trunnion 34 by a nut 35 substantially as shown in Figs. 1 and 2. The rocker 31 is the sole connecting link between the two wheels D and E (or F and G) and, by virtue of the associated mechanism just described, serves materially to reduce the amount of motion transmitted to the end of the spring 14 when the wheels D or E move upwardly or downwardly in traversing an uneven road surface. It will be apparent that if the wheel E, for example, were to encounter a high spot in the road, the raising of the wheel E would actuate the arm 20, which in turn would tend to pull downwardly on the connecting link 27 and the corresponding end of the rocker 31, while the opposite end of the rocker 31 would be raised pulling the coupling link 27' and the attached end of arm 20' upwardly, thus exerting a downward thrust on the wheel D. The action of this compensating mechanism is similar to that of the modified form illustrated in Fig. 9 of my copending application Serial No. 223,275. In this present invention, however, the compensating mechanism is supported on a spring member which is capable of materially reducing the shock transmitted to the vehicle chassis. For instance, if one or both of the wheels D or E were to encounter a sudden bump or obstruction in the road, the consequent upward thrust on the cap 15 and other parts would be cushioned by the leaf spring 14, while the rocker 31 and connected mechanism would simultaneously function to equalize the load on the wheels D and E.

Figure 4:
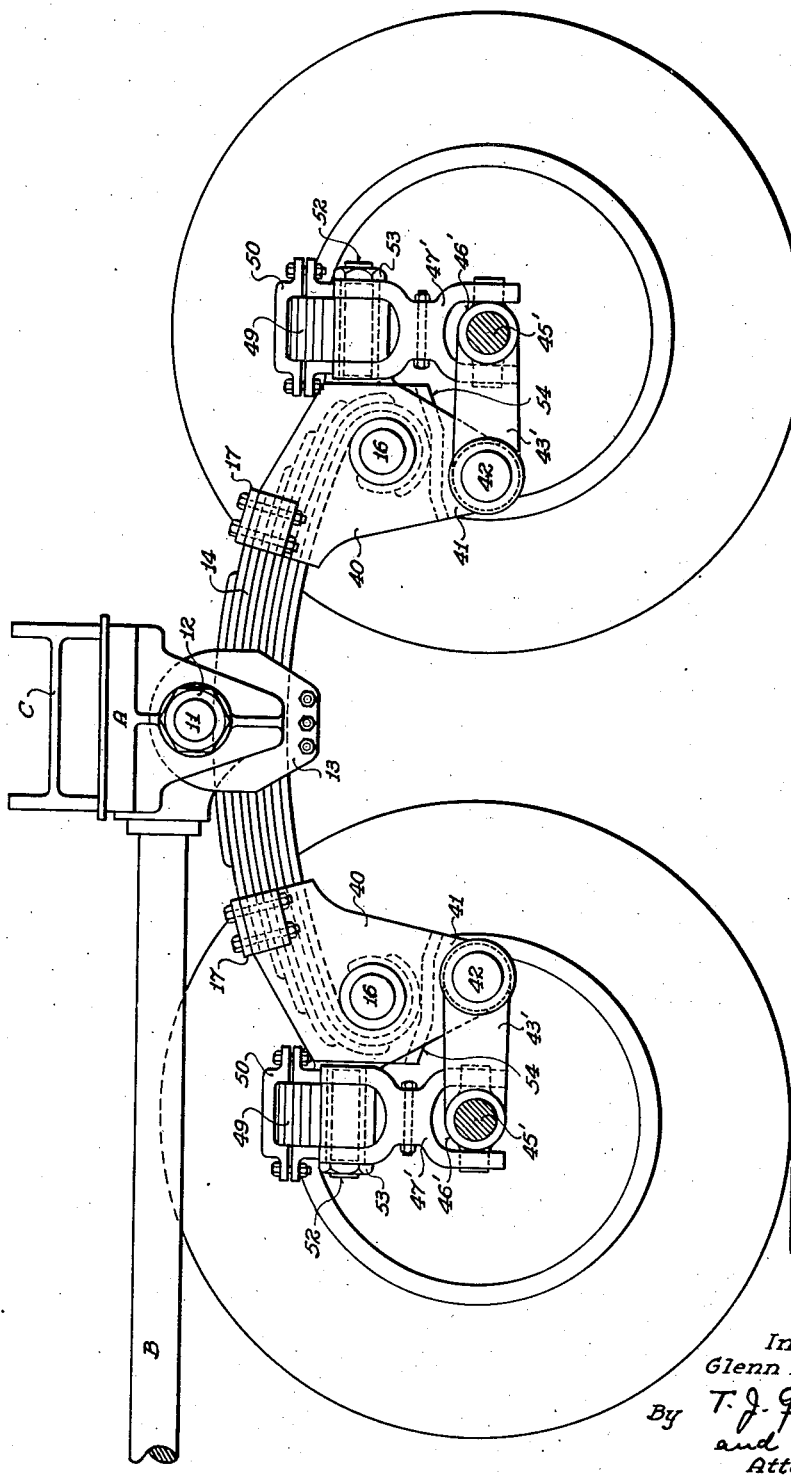
Fig. 4 is a side elevation, partly in vertical section, similar to Fig. 1, but showing a modification in the construction illustrated in Fig. 1.
Figure 5:
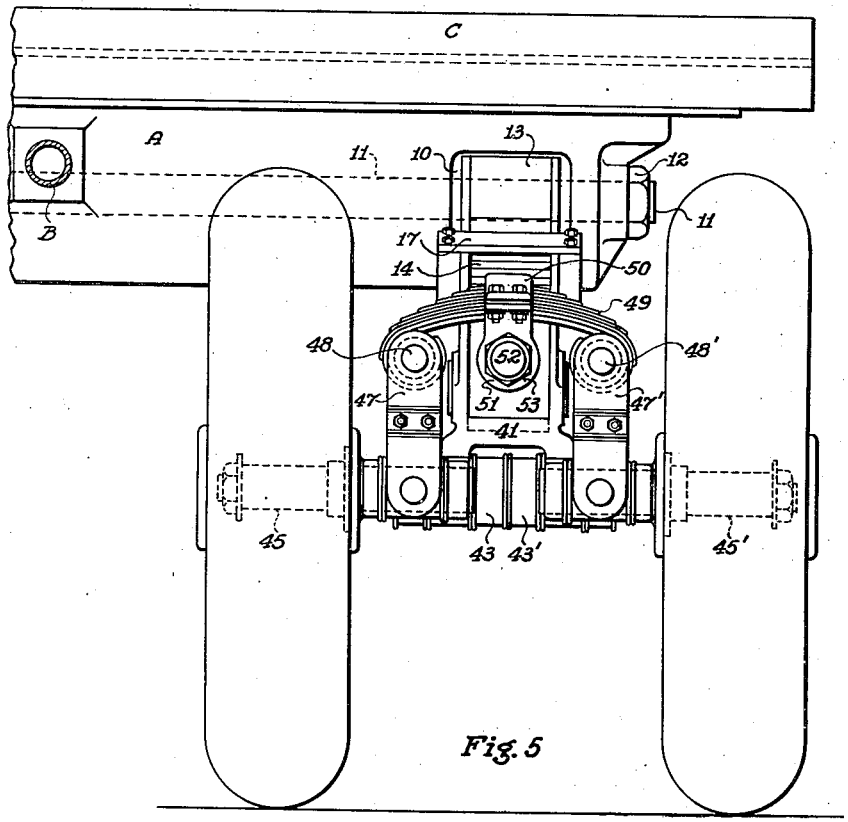
Fig. 5 is an end elevation corresponding to Fig. 4.

In the modified form of my invention illustrated in Figs. 4 and 5 I provide further flexibility of motion by incorporating a resilient member in each of the compensating mechanisms, which are, as before, identical and are carried on caps 40 on the ends of the leaf spring 14. The caps 40, in this construction, are adapted to support the compensating linkage in a position directly above the aligned wheel spindles and beyond the ends of the leaf spring 14. The lower part of each cap 40 is made in the form of a depending yoke 41 in which is secured a hinge pin 42 providing hinge means for a pair of arms 43 and 43' which carry the wheel spindles 45 and 45'. Pivot bearings 46 and 46' are rotatably mounted on the spindles 45 and 45', respectively, and the lower legs of H-shaped coupling links 47 and 47' are pivotally connected to them. The upper legs of these coupling links 47 and 47' are similarly pivotally connected to short shafts 48 and 48' secured in eyes formed at the opposite ends of a transverse leaf spring or rocker 49, substantially as shown in Fig. 5. A cradle 50 is clamped to the middle of spring rocker 49. This cradle 50 has a depending boss 51 which is mounted for free rotation on a trunnion 52 made fast in the cap 40 and extending horizontally therefrom. A nut 53 retains the cradle 50 against axial displacement. Thus, in this construction when either or both wheels encounter a sudden rise in the road surface, the rocker spring 49 will absorb part of the shock in the compensating mechanism itself, while there will be additional absorption of the shock, if necessary, by the spring 14, as previously described.

While I have described the forms in which I make my invention as constituting the spring mounting for a heavy duty trailer, obviously this same mounting is suitable for use with other vehicles, such as trucks, or in any similar bogie construction. Furthermore, several other modifications and substitutions in the individual members might be made without departing from the principle of my invention. It is not my intention to limit my invention otherwise than as set forth in the claims.

I claim:

1. In a vehicle, a longitudinal spring member, a pair of wheel-carrying assemblies supported on said spring, each wheel-carrying assembly including a horizontal wheel spindle, the spindles in each pair of assemblies extending in opposite directions, said wheel-carrying assemblies hinged for up and down movement in parallel planes, compensating means connecting said wheel-carrying assemblies, said compensating means including a resilient member supported by said spring member, and links connecting the ends of said resilient member to said wheel-carrying assemblies, respectively.

2. In a vehicle, a leaf spring extending longitudinally of the vehicle, a cap on each end of said spring, a pair of wheel-carrying assemblies hinged to each cap, said wheel-carrying assemblies hinged to said cap for up and down movement in parallel planes, compensating means connecting each pair of said wheel-carrying assemblies, said compensating means including a transversely extending spring pivotally mounted on said cap, and links connecting the ends of said transversely extending spring to said wheel-carrying assemblies, respectively.

3. In a vehicle, a longitudinal spring member, a cap rigidly secured to an end of said spring member, a pair of cranked axles hinged to said cap and entirely supported on said cap, the hinges of said cranked axles being perpendicular to said longitudinal spring member, whereby said cranked axles may move up and down in vertical planes spaced constantly the same distance apart, an upstanding link pivotally connected to each cranked axle, compensating means pivotally mounted on said cap, said links pivotally connected to said compensating means, said compensating means and said links so constructed and arranged that upward movement of one of said cranked axles will cause a force to be exerted in the opposite direction on the other cranked axle.

4. In a vehicle, a longitudinal spring member, a cap rigidly secured to an end of said spring member, a pair of wheel-carrying assemblies hinged to the bottom of said cap and entirely supported on said cap, each assembly including a horizontal wheel spindle, the spindles of said wheel assemblies extending in opposite directions, the hinges of said wheel-carrying assemblies being perpendicular to said longitudinal spring member whereby said wheel-carrying assemblies may move up and down in vertical planes spaced constantly the same distance apart, an upstanding link pivotally connected to each wheel-carrying assembly, compensating means pivotally mounted on said cap, said links pivotally connected to said compensating means, said compensating means including a stub shaft mounted in said cap and extending parallel to said spring member, a transverse rocker mounted on said shaft and said upstanding links connected respectively the ends of said rocker.

5. In a vehicle, a longitudinal leaf spring, a cap rigidly secured to each end of said spring, a pair of cranked axles hinged to each cap and entirely supported on the cap, the hinges of said cranked axles being perpendicular to said longitudinal spring whereby the cranked axles of each pair may move up and down in vertical planes spaced constantly the same distance apart, an upstanding link pivotally connected to each cranked axle, compensating means pivotally mounted on each of said caps, said links pivotally connected to said compensating means, each of said compensating means including a stub shaft mounted in the cap and extending parallel to said spring, a transverse rocker mounted on said shaft and said upstanding links connected respectively to the ends of said rocker.

6. In a vehicle, a longitudinal pivotally-mounted leaf spring, a cap rigidly secured to each end of said spring, a pair of wheel-carrying assemblies hinged to the bottom of each cap and entirely supported on the cap, each assembly including a horizontal wheel spindle, the spindles of each pair of said wheel assemblies extending in opposite directions, the hinges of said wheel-carrying assemblies being perpendicular to said longitudinal spring whereby the wheel-carrying assemblies of each pair may move up and down in vertical planes spaced constantly the same distance apart, an upstanding link pivotally connected to an end of each wheel-carrying assembly, compensating means pivotally mounted on each of said caps, said links pivotally connected to said compensating means, said compensating means and said links so constructed and arranged that upward movement of one of said wheel-carrying assemblies of a pair will cause a force to be exerted in the opposite direction on the other wheel-carrying assembly of that pair.

GLENN L. LARISON.